United States Patent Office 3,284,295
Patented Nov. 8, 1966

3,284,295
STABLE PULVERULENT PESTICIDE
FORMULATIONS
Milton R. Johnson, Springfield, N.J., assignor to Shell
Oil Company, New York, N.Y., a corporation of Delaware
No Drawing. Filed Feb. 17, 1964, Ser. No. 345,097
6 Claims. (Cl. 167—42)

This invention relates to new and improved pesticidal compositions of matter. More particularly this invention pertains to new and improved pulverulent insecticidal formulations such as dusts, granules, baits, wettable powders and the like, in which the insecticides are combinations of (a) chlorinated cyclic hydrocarbons and (b) thiophosphates.

Pulverulent pesticidal formulations based upon solid carrier materials are commonly employed to control noxious organisms when certain properties and performance are required. In general, pulverulent formulations possess greater residual effectiveness than corresponding liquid formulations. Generally, pulverulent formulations are less susceptible to weathering. Frequently, toxicants are insoluble in the common vehicles used for liquid formulations, and the only practical means of formulating them is by incorporation with a solid carrier. These pulverulent formulations may be used neat, as dusts, granules, or when formulated with suitable adjuvants may be used as wettable powders and applied as aqueous suspensions.

There is a growing trend toward combining two or more pesticides, of different characteristics, to take advantage thereof and then to control a wider spectrum of pests in a single application. Of major interest, in this respect, are combinations of (a) chlorinated cyclic hydrocarbon insecticides and (b) thiophosphate insecticides, for these materials not only have somewhat different spectra of insecticidal activity, but have quite different modes of action with respect to species of insects controlled by both, thus supplementing each other's effectiveness.

It has been found, however, that such combinations cannot be prepared by simply mixing the two types of insecticides, and the carrier, for it has been found that the insecticides are unstable in the presence of each other and the carrier.

It has been further found, however, that such combinations can be made successfully, and are stable, if there is intimately incorporated therewith a stabilizing amount of one or more of certain amides, the suitable amides being unsubstituted amides of alkanoic acids and thio counterparts.

The suitable amides of alkanoic acids and their thio counterparts have the formula

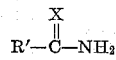

wherein R' represents alkyl, preferably containing from 1 to 20 carbon atoms, of either straight-chain or branched-chain configuration.

Suitable amides thus include, for example, formamide, acetamide, propionamide, butyramide, valeramide, caproamide, strearamide and the corresponding thioamides. These, among others, may be employed to stabilize poly chlorinated-substituted hydrocarbons and organophosphorus toxicant combinations in pulverulent compositions.

The polychlorine-substituted cyclic hydrocarbons which may be employed in the improved compositions of this invention are characterized in U.S. Patents 2,868,688, 2,676,132, 2,799,685, 2,879,275 and 2,565,471 inter alia. The preferred toxicants include, aldrin, dieldrin, endrin, isodrin, chlordane, heptachlor, toxaphene, strobane, and Telodrin® insecticide (1,3,4,5,6,7,8,8-octachloro-3a, 4,7,7-alpha-tetrahydro-4,7-methanophthalan).

The organophosphorus component of the pulverulent composition may be phosphorothioate, as parathion, methyl parathion, phorate, trithion, methyl trithion and demeton.

The suitable carrier materials are the customary diluents, carriers, extenders, or fillers which are useful for preparation of dry pesticidal dusts, granules, wettable powders, and the like, having high intrinsic acidity, such as the kaolinite clays, e.g., kaolinite, nacrite, dickite and anauxite, the attapulgite clays, e.g., attapulgite and sepiolite, the montmorillonite clays, e.g., montmorillonite, saponite, nontronite, and beidellite. Less strongly acid carriers include among others silicates such as talc, mica and pyrophyllite, sulfates, such as gypsum, and carbonates, such as calcite and dolomite. The diluents can be employed singly or mixtures may be used. Other diluents may be included, such as walnut shell and other botanical flours, diatomites, elemental sulfur, and the like.

The dusts or wettable powders of this invention can be prepared with the addition of adjuvants known to those skilled in the pesticide formulating art. These adjuvants include wetting agents, sticking agents, dispersing agents or deflocculants and the like. Casein, gelatine, cellulose derivatives, gums, synthetic resins, mineral oil, or equivalent adhesives well known to the art may be used as sticking agents. Wetting and dispersing agents may include inter alia soaps, saponins, lecithins, fatty acid salts, long-chain alcohols, sulfonated aliphatic and/or aromatic hydrocarbon derivatives, hydroxy esters, such as sorbitan monolaurate, pine oil and the like.

The stabilizing agent may be blended into the pulverulent composition after the toxicants and adjuvants have been mixed or may be incorporated into the diluent prior to the addition of the toxicants. The compositions of this invention are prepared by the customary methods of the art for preparing pulverulent pesticidal compositions. The stabilizing agent may be present in the combination formulation at levels as low as 0.1 percent by weight of the diluent, or on occasion as much as 20 percent by weight of the diluent may be required. Preferred concentrations of the stabilizing agent ranges from 1 to 5 percent by weight of the diluent. The choice of concentration of the amide employed would depend upon the nature of the diluent used in the composition and the ratio of diluent to toxicant.

The concentration of the chlorinated cyclic hydrocarbon and thiophosphate insecticides in the final formulation can vary widely, depending upon the use to which the formulation is to be placed. Thus, the total insecticide concentration can be as little as 0.1 percent of the weight of the formulation or it can be as great as 50% or even more, in the case of the so-called "concentrated" formulations which are to be diluted before use. Typically, a granular formulation may contain from about 2% to about 35% total insecticide by weight. This type of formulation is generally used as such without further dilution with an insecticidally inert carrier.

Typically, a dust formulation can contain about 0.25% insecticide up to about 75% total insecticide by weight. Frequently, the dust formulations are first prepared as so-called "concentrates" which contain typically from about 10% to about 50% total insecticide dispersed in the dust, and such "concentrate" is further diluted to a so-called "field strength" dust typically having a total insecticide concentration of about 0.25% to about 5% varying with the use desired and the potency of the toxicants.

The relative amounts of the chlorinated cyclic hydrocarbon and thiophosphate insecticides can vary according to the particular use placed upon the final pulverulent formulation. Thus, the proportions of each can be approximately equal or upon occasions as much as ten times the content of the chlorinated cyclic hydrocarbon or on other occasions as little as one tenth of the chlorinated cyclic hydrocarbon in relation to the quantity of the thiophosphate may be required for control of a particular pest complex.

The wettable powders typically contain a concentration of toxicant on the order of that contained in dust concentrates as above described. However, they are diluted to "field strength" by dispersing in water rather than by dispersing in dust.

The following examples are presented to illustrate certain specific modes of applying the principles of this invention and should not be interpeted as limiting the scope of the invention to the particular embodiments of these examples.

Example I

A 2% endrin–2% methyl parathion dust was prepared in a ribbon blender by mixing the ingredients shown in the table below. Endrin and methyl parathion analyses were conducted on the composition after two weeks storage in a ventilated oven at 130° F.

| Composition, Percent Weight | Percent Weight in Composition | |
|---|---|---|
| | Formulation A | Formulation B |
| 20% methyl parathion concentrate on carrier mixture of 14% Hi-Sil 233, 86% kaolin clay | 10 | 10 |
| 25% endrin concentrate on Cohutta talc | 8 | |
| 25% endrin concentrate on Cohutta talc with 1% acetamide | | 8 |
| Pyrax ABB | 82 | 82 |
| Decomposition, percent weight after 2 weeks at 130° F: | | |
| Endrin | 70 | 4 |
| Methyl parathion | 0 | 12 |

The data clearly show that the addition of 1% acetamide to the 25% endrin talc concentrate markedly reduced the endrin decomposition and simultaneously only slightly reduced the methyl parathion content of the composition when stressed to two weeks storage at 130° F.

Example II

25% endrin, 35% methyl parathion dust concentrates with and without the addition of acetamide were prepared according to the proportions indicated in the table below. After storage at 130° F. for two weeks the content of endrin and methyl parathion was determined.

| Composition, Percent Weight | Percent Weight in Composition | |
|---|---|---|
| | Formulation A | Formulation B |
| 50% endrin concentrate on Hi-Sil 233 | 50 | |
| 50% endrin concentrate on Hi-Sil 233 with 5% acetamide | | 50 |
| Technical methyl parathion, 80% purity | 43.8 | 43.8 |
| Hi-Sil 233 | 6.2 | 6.2 |
| Decomposition, percent weight after 2 weeks at 130° F: | | |
| Endrin | 29 | 6 |
| Methyl parathion | 3 | 10 |

In formulation B, containing the acetamide in the 50% endrin concentrate there was only minor decomposition of the endrin and a corresponding slight decomposition of the methyl parathion. On the other hand, formulation A, containing no acetamide, showed an appreciable decline of endrin content after two weeks storage at 130° F.

Example III

A 10% methyl parathion, 8% endrin dust was prepared from a 20% methyl parathion dust concentrate on Hi-Sil and kaolin clay and a 25% endrin talc concentrate which contained 1% urea. After 2 weeks storage at 130° F., only 5% decomposition of endrin occurred while the methyl parathion content declined only 12%. On the other hand, a dust similarly prepared without the addition of urea after 2 weeks storage at 130° F. showed no decomposition of methyl parathion but a 70% loss of the endrin.

Example IV

A 25% endrin–35% methyl parathion concentrate dust was prepared with and without the addition of 2.5% urea. The concentrate dust was prepared according to Example II and similarly evaluated for stability. The urea stabilized dust showed a decomposition of 10% methyl parathion and 6% endrin while the preparation without urea lost 3% methyl parathion and 29% endrin.

I claim as my invention:

1. A stable pulverulent insecticide composition comprising
   a cyclic polychlorohydrocarbon toxicant selected from the group consisting of aldrin, dieldrin, endrin, isodrin, chlordane, heptachlor, toxaphene, strobane, and 1,3,4,5,6,7,8,8-octachloro-3a,4,7,7-alpha-tetrahydro-4,7-methanophthalan;
   a thiophosphate toxicant selected from the group consisting of parathion, methyl parathion, phorate, trithion, methyl trithion, and demeton;
   an inert horticultural diluent; and a stabilizer of the formula

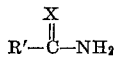

where X is selected from the group consisting of oxygen and sulfur, and R' is alkyl of from 1 to 20 carbon atoms.

2. The composition of claim 1 wherein X is oxygen.
3. The composition of claim 1 wherein the stabilizer is acetamide.
4. The composition of claim 1 wherein the stabilizer is acetamide and said acetamide is present in content of from 0.1% to 20% by weight of the diluent.
5. The composition of claim 1 wherein the cyclic toxicant is endrin and the thiophosphate toxicant is methyl parathion.
6. The composition of claim 1, wherein the cyclic toxicant is endrin, the thiophosphate toxicant is methyl parathion, and the stabilizer is acetamide.

References Cited by the Examiner

UNITED STATES PATENTS 3,024,164   3/1962   Sawyer _____ 167—42

OTHER REFERENCES

Frear: Pesticide Index, College Science Publishers, P.O. Box 798, State College, Pennsylvania (1961) Group A pages 17, 18, 41, 73, 103, 116, 122, 143, 174, 179, Group B pages 60, 75, 89, 135, 146, 152.

Chemical Abstracts 46: 4163a (1952).

The Merck Index of Chemicals and Drugs, Seventh Edition, Merck & Co., Inc., Rahway, New Jersey, 1960, p. 4.

JULIAN S. LEVITT, *Primary Examiner.*

J. D. GOLDBERG, *Assistant Examiner.*